United States Patent
Szamlewski et al.

(10) Patent No.: US 9,844,753 B2
(45) Date of Patent: Dec. 19, 2017

(54) EQUIPMENT FOR PURIFYING A WET GAS STREAM CONTAINING $CO_2$ AND NOX

(71) Applicant: L'Air Liquide, Société Anonyme pour l'Etude et l'Exploitation des Procédés Georges Claude, Paris (FR)

(72) Inventors: Christophe Szamlewski, Combs la Ville (FR); Christian Monereau, Montpellier (FR); Samuel Amy, Champigny sur Marne (FR); Mathieu Leclerc, Paris (FR); Thierry Gesbert, Verrieres le Buisson (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 191 days.

(21) Appl. No.: 14/416,917

(22) PCT Filed: Jun. 3, 2013

(86) PCT No.: PCT/FR2013/051249
§ 371 (c)(1),
(2) Date: Jan. 23, 2015

(87) PCT Pub. No.: WO2014/016481
PCT Pub. Date: Jan. 30, 2014

(65) Prior Publication Data
US 2015/0165374 A1    Jun. 18, 2015

(30) Foreign Application Priority Data

Jul. 25, 2012 (FR) .................................... 12 57190

(51) Int. Cl.
*B01D 53/04* (2006.01)
*B01D 53/047* (2006.01)
(Continued)

(52) U.S. Cl.
CPC ......... *B01D 53/82* (2013.01); *B01D 53/0423* (2013.01); *B01D 53/261* (2013.01);
(Continued)

(58) Field of Classification Search
None
See application file for complete search history.

(56) References Cited

U.S. PATENT DOCUMENTS

| | | | |
|---|---|---|---|
| 6,059,863 A | 5/2000 | Monereau et al. | |
| 2003/0205130 A1 | 11/2003 | Neu et al. | |

(Continued)

FOREIGN PATENT DOCUMENTS

| | | |
|---|---|---|
| EP | 0 898 998 | 3/1999 |
| FR | 2 937 257 | 4/2010 |
| FR | 2 962 663 | 1/2012 |

OTHER PUBLICATIONS

French Search Report and Written Opinion for corresponding FR 1257190, dated Mar. 22, 2013.
(Continued)

*Primary Examiner* — Daniel Berns
(74) *Attorney, Agent, or Firm* — Elwood L. Haynes

(57) ABSTRACT

A plant for purifying a gas stream comprising at least 0.02% by volume of water, $CO_2$ and NOx, comprising an adsorber characterized by:
  a cavity (1);
  an adsorbent (2) included in the cavity (1);
  an outer casing (3) made of carbon steel;
  an inner casing (4) made of stainless steel making a space having a width of between 10 and 100 mm between said inner casing and the outer casing, said space being at equal pressure with the cavity.

11 Claims, 2 Drawing Sheets

(51) Int. Cl.
*B01D 53/06* (2006.01)
*B01D 53/26* (2006.01)
*B01D 53/56* (2006.01)
*B01D 53/62* (2006.01)
*B01D 53/81* (2006.01)
*B01D 53/82* (2006.01)
*B01D 53/83* (2006.01)
*B01D 53/96* (2006.01)

(52) U.S. Cl.
CPC ........... *B01D 53/565* (2013.01); *B01D 53/62* (2013.01); *B01D 2253/106* (2013.01); *B01D 2256/22* (2013.01); *B01D 2257/404* (2013.01); *B01D 2258/0283* (2013.01)

(56) References Cited

U.S. PATENT DOCUMENTS

2011/0197422 A1 8/2011 Monereau et al.
2013/0115155 A1 5/2013 Sanchez-Molinero et al.

OTHER PUBLICATIONS

International Search Report and Written Opinion for corresponding PCT/FR2013/051249, dated Aug. 27, 2013.
Translation of Written Opinion for corresponding PCT/FR2013/051249, dated Aug. 27, 2013.

EQUIPMENT FOR PURIFYING A WET GAS STREAM CONTAINING $CO_2$ AND NOX

CROSS REFERENCE TO RELATED APPLICATIONS

This application is a 371 of International PCT Application PCT/FR2013/051249 filed Jun. 3, 2013 which claims priority to French Application No. 1257190 filed Jul. 25, 2012, the entire contents of which are incorporated herein by reference.

BACKGROUND

The present invention relates to a plant for purifying a wet gas stream, containing $CO_2$ and NOx and to a purification process using such a plant.

The expression "wet gas" is understood to mean a gas having a relative humidity of greater than 30%, preferably of greater than 80%, more preferably saturated with water under the operating conditions, or even supersaturated since it could contain entrained particles of liquid water.

The expression "containing $CO_2$" is understood to mean a $CO_2$ content of greater than 20 mol %, preferably greater than 50 mol %, more preferably greater than 80 mol %.

The expression "containing NOx" is understood to mean that the content of NOx (or nitric acid) is greater than or equal to 10 ppm by mole, preferably greater than 100 ppm.

SUMMARY

In order to reduce emissions of $CO_2$ of human origin into the atmosphere, processes for capturing the $CO_2$ generated in a given process have been developed. It is a question of extracting the $CO_2$ from a gas generated by the process, optionally purifying it and finally, in general, compressing it in order to transport it in a pipeline. This treatment generally necessitates at least partially drying the $CO_2$.

The gases resulting from processes of oxy-fuel combustion type have a high $CO_2$ content since the nitrogen has been removed from the air before combustion. These gases also contain a percentage of NOx (NO & $NO_2$ predominantly) resulting from the combustion. These NOx will enter the adsorbers that aim to dry the $CO_2$ in the form of NO, $NO_2$ and also in the form of nitric acid ($HNO_3$) resulting from the conversion of NO to $NO_2$ and of $NO_2$ to $HNO_3$, in particular if the purification takes place after compression and cooling. The $HNO_3$ are retained by the adsorbent of the adsorbers and NO and $NO_2$ are partially retained. In the adsorber, the reactions for the conversion of NO to $NO_2$ and of $NO_2$ to $HNO_3$ are accelerated and the equilibria are shifted toward the formation of $HNO_3$. When the adsorbent is regenerated, during the desorption of the previously adsorbed NOx, there is also a possibility of forming nitric acid in the presence of the water trapped during the adsorption. This nitric acid will be found in the water at a high concentration. This hot nitric acid will have a tendency to condense on the walls of the adsorber, level with the shell and the outlet end of the regeneration gas which are slightly colder due to inevitable heat losses, even in the case of advanced insulation. Furthermore, the acidic liquids will have a tendency to flow toward the bottom of the dryers since the regeneration takes place from top to bottom, which is generally preferred in order to facilitate the discharging of said liquids by making use of gravity.

Yet at these temperatures, which are above ambient temperature due to the heat of regeneration, the corrosion kinetics will also increase. In order to prevent the problem of corrosion within the adsorber linked to the presence of hot concentrated nitric acid, one solution from the prior art is to make the adsorber out of noncorrodible materials of NAG (nitric acid grade) type. However, this solution amounts to multiplying the cost of the adsorbers by approximately 3.

Another known solution is to apply a coating made of a corrosion-resistant noble material to the inner surface of the shell which can then be made of carbon steel. This process is generally referred to as plating. However, for large-sized equipment, it is only carried out by a limited number of companies considering the devices needed. The cost premium linked to plating may largely offset the advantage of partially using a less expensive material. With this solution, it is necessary to be wary of the risks of local corrosion (ends, connections with internals).

One possible improvement is to only plate the part of the shell capable of being corroded. However, it is difficult to be truly certain that one part of the shell will not be subject to corrosion (advance of the front linked to aging of the adsorbent, modification of the operating conditions, entrainment of liquid water, etc.). Partial plating is not therefore 100% failsafe.

Consequently, one problem that is faced is to provide a novel purification plant that is not subject to the problem of corrosion of the materials while limiting the impact of the cost.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
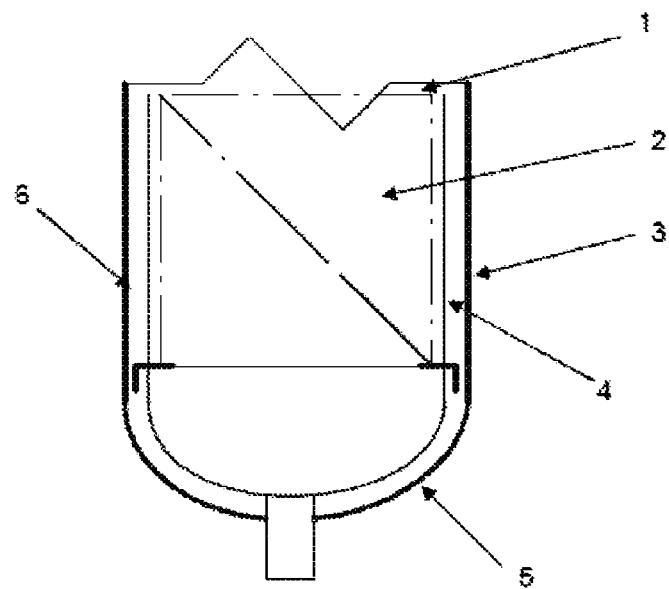
FIG. 1 illustrates one embodiment of the present invention

One solution to the present invention is a plant for purifying a gas stream comprising at least 0.02% by volume of water, $CO_2$ and NOx, comprising an adsorber characterized by:
- a cavity 1;
- an adsorbent 2 included in the cavity 1;
- an outer casing 3 made of carbon steel;
- an inner casing 4 made of stainless steel making a space between 10 and 100 mm wide, preferably between 20 and 70 mm wide, between said inner casing and the outer casing, said space being at equal pressure with the cavity 1.

Note that the double inner casing makes it possible to protect the adsorber from corrosion whilst the carbon steel outer casing makes it possible to withstand the pressure (1 to 60 bar).

The inner casing may in practice consist of several casings around one another, separated by a few millimeters to a few tens of millimeters. The advantage of such a system is to create very good thermal insulation using the gas itself as insulator, which has low thermal conductivity relative to the solids.

In practice, even though multilayer inner casings can be envisaged, the solution with two casings is recommended since with the space between the shell and the outer casing (of the inner part), this already constitutes very effective thermal insulation. This system (1 shell, 2 inner casings) is generally referred to as "double gas-filled space".

In this case, only the innermost casing may be made of stainless steel, the other or others being, for example, made of carbon steel like the shell of the adsorber.

The space between the inner casing and the outer casing (shell), like that between the two inner casings in the "double gas-filled space" case (2 gas-filled spaces are generally sufficient to ensure a very good thermal insulation but it could be envisioned to use more thereof) is at any moment at the pressure reigning in the adsorber. This single or multiple inner shell does not therefore have a mechanical strength role other than holding the adsorbent and the thickness thereof is minimal.

The various inter-wall spaces must therefore be in sufficient gas connection so that the variations of the operating pressure have an effect instantaneously on both sides both in the event of pressurization and depressurization. It is said that these gas volumes are at equal pressure, although there can be several tens of millibars difference depending on the operating phases and/or the height in the adsorber due to pressure losses through the adsorbent bed.

This gas connection is made on the dry gas side so that there is no water capable of condensing on the sheets made of standard material (not of noncorrodible type).

Figure 2:
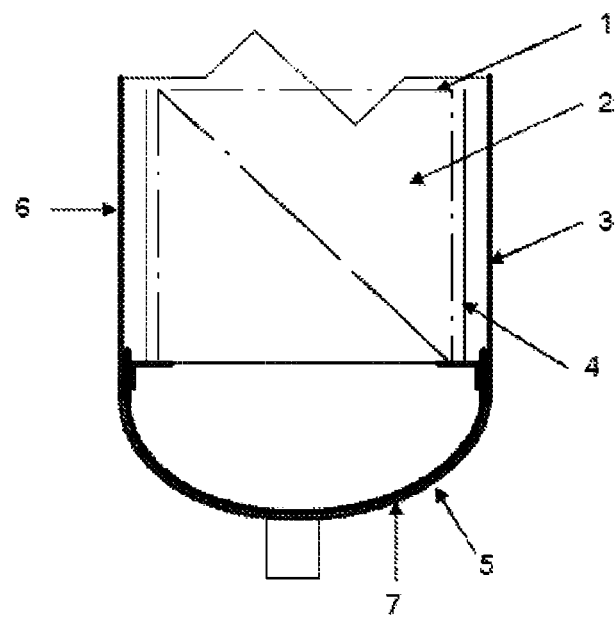
FIG. 2 illustrates another embodiment of the present invention.
Figure 3:
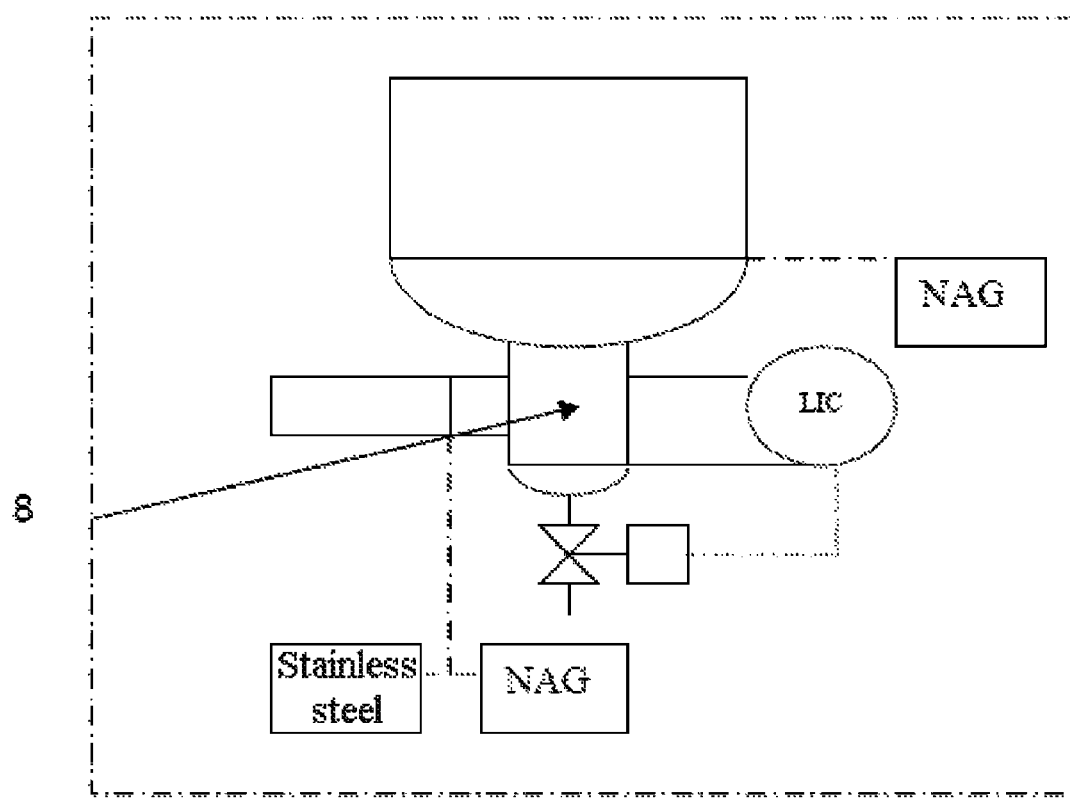
FIG. 3 illustrates another embodiment of the present invention.

Depending on the case, the plant according to the invention may have one or more of the following characteristics:
  the space is at equal pressure with the cavity by means of a gas connection that opens into the cavity 1 downstream of the adsorbent 2 when considering the path of the gas stream;
  the inner casing is divided into at least two inner casings that form a double casing;
  among the two inner casings, only the innermost inner casing of the adsorber is made of stainless steel;
  the outer casing is divided into a shell 6, a first base 5 on the inlet side of the gas stream and a second base on the outlet side of the gas stream, and the inner casing 4 is present level with the shell 6 and continues over the first base 5 (cf. FIG. 1).
  the outer casing is divided into a shell 6, a first base 5 on the inlet side of the gas stream and a second base on the outlet side of the gas stream, the double inner casing is present level with the shell, and a stainless steel plate 7 is plated on the first base 5 (cf. FIG. 2). In this case, the stainless steel plate is welded to the lower base of the adsorber and will be used partly as support for the adsorbents. With this solution, the plating is limited to one portion of the equipment, therefore reducing the production cost thereof.
  said adsorber comprises a separation pot 8 integrated into or joined to the first base that makes it possible to separate acid condensates from a gas leaving on the inlet side of the gas stream to be purified and an outlet pipe for discharging said gas stripped of its condensates (cf. FIG. 3).
  the adsorber comprises silica gel as adsorbent.
  the pipes of the plant are corrodible.

Note that in the case where the adsorber comprises a double inner casing level with the shell and a stainless steel plate covering the lower base, a stainless steel protective part ensures the continuity between the double casing and the lower base.

Another subject of the present invention is a process for purifying a gas stream comprising at least 0.02% by volume of water, $CO_2$ and NOx, using a plant according to the invention, wherein said adsorber is subjected to a purification cycle comprising an adsorption step and a regeneration step using a regeneration gas and characterized by the presence of nitric acid and liquid water in the adsorber during the regeneration step.

Preferably, the nitric acid and the water are discharged from the plant via the separator pot. Specifically, the double casing and/or the stainless steel plate will enable the runoff of the water and of the acid to the outlet pipe and to the separator pot.

The regeneration step is preferably carried out at a temperature above 150° C.

The invention claimed is:

1. A process for purifying a gas stream comprising, $CO_2$, NOx, and at least 0.02% by volume of water, comprising using an adsorber, wherein said adsorber comprises:
   a cavity;
   an adsorbent included within the cavity;
   an outer casing made of carbon steel;
   an inner casing made of stainless steel, wherein a space between 10 and 100 mm wide is between said inner casing and the outer casing, said space being at equal pressure with the cavity, the process comprising subjecting the adsorber to a purification cycle comprising an adsorption step and a regeneration step using a regeneration gas and wherein nitric acid and liquid water are present in the adsorber during the regeneration step.

2. The process as claimed in claim 1, wherein the adsorber further comprises a separator pot, and wherein the nitric acid and the liquid water are removed from the adsorber via the separator pot.

3. The process of claim 1, wherein the regeneration step is carried out at a temperature above 150° C.

4. An apparatus for purifying a gas stream comprising $CO_2$, NOx, and at least 0.02% by volume of water, comprising an adsorber, wherein said adsorber comprises:
   a cavity;
   an adsorbent included within the cavity;
   an outer casing made of carbon steel;
   an inner casing made of stainless steel, wherein a space between 10 and 100 mm wide is between said inner casing and the outer casing, said space being at equal pressure with the cavity.

5. The apparatus in claim 4, wherein the space is at equal pressure with the cavity by means of a gas connection that opens into the cavity downstream of the adsorbent when considering the path of the gas stream.

6. The apparatus in claim 4, wherein the inner casing is divided into at least two inner casings that form a double casing.

7. The apparatus in claim 6, wherein, among the two inner casings, only the innermost inner casing of the adsorber is made of stainless steel.

8. The apparatus in claim 4, further comprising;
   the outer casing divided into a shell, a first base on the inlet side of the gas stream and a second base on the outlet side of the gas stream, and
   the inner casing is present level with the shell and continues over the first base.

9. The apparatus in claim 4, further comprising;
   the outer casing divided into a shell, a first base on the inlet side of the gas stream and a second base on the outlet side of the gas stream, the inner casing is present level with said shell, and a stainless steel plate is plated on the first base.

10. The apparatus of claim 8, further comprising:
said adsorber comprises a separation pot integrated into or joined to the first base that makes it possible to separate acid condensates from a gas leaving on the inlet side of the gas stream to be purified and an outlet pipe for discharging said gas stripped of its condensates.

11. The apparatus of claim 4, wherein the adsorber comprises silica gel as adsorbent.

* * * * *